United States Patent
Mahendravarman et al.

(10) Patent No.: US 12,147,776 B2
(45) Date of Patent: Nov. 19, 2024

(54) METHOD FOR EXTRACTING INFORMATION FROM AN UNSTRUCTURED DATA SOURCE

(71) Applicant: AtomLeap GmbH, Berlin (DE)

(72) Inventors: Raghavendran Pownraju Mahendravarman, Potsdam (DE); Berinike C. K. Tech, Berlin (DE); Arsen Hnatiuk, Berlin (DE); Robin P. G. Tech, Berlin (DE)

(73) Assignee: AtomLeap GmbH, Berlin (DE)

( * ) Notice: Subject to any disclaimer, the term of this patent is extended or adjusted under 35 U.S.C. 154(b) by 297 days.

(21) Appl. No.: 17/717,514

(22) Filed: Apr. 11, 2022

(65) Prior Publication Data
US 2023/0325606 A1   Oct. 12, 2023

(51) Int. Cl.
| | |
|---|---|
| *G06F 40/40* | (2020.01) |
| *G06F 16/34* | (2019.01) |
| *G06F 16/951* | (2019.01) |
| *G06F 40/295* | (2020.01) |

(52) U.S. Cl.
CPC ........... *G06F 40/40* (2020.01); *G06F 16/345* (2019.01); *G06F 16/951* (2019.01); *G06F 40/295* (2020.01)

(58) Field of Classification Search
CPC ...... G06F 40/40; G06F 16/345; G06F 16/951; G06F 40/295; G06F 16/35; G06F 16/214
See application file for complete search history.

(56) References Cited

U.S. PATENT DOCUMENTS

| | | | |
|---|---|---|---|
| 8,700,997 B1 * | 4/2014 | Yang ................... | G06F 8/33 717/114 |
| 9,299,108 B2 * | 3/2016 | Diana ................... | G06Q 40/08 |
| 10,620,854 B1 * | 4/2020 | James ................... | G06F 3/067 |
| 2009/0327115 A1 * | 12/2009 | Schilder ............... | G06F 16/36 705/35 |
| 2017/0039271 A1 * | 2/2017 | Bishop ................. | G06F 40/211 |
| 2018/0341860 A1 * | 11/2018 | Shazeer ............... | G06N 3/04 |
| 2019/0005020 A1 * | 1/2019 | Gregory .............. | G06F 18/2411 |
| 2019/0340503 A1 * | 11/2019 | Cheng ................. | G06F 16/3332 |
| 2020/0279621 A1 * | 9/2020 | Degenaro ............. | G06N 5/01 |
| 2020/0311214 A1 * | 10/2020 | Chatterjee ............ | G06N 20/00 |
| 2021/0174449 A1 * | 6/2021 | Thomas ............... | G06N 3/08 |
| 2023/0135962 A1 * | 5/2023 | Lee ...................... | G06F 40/216 704/9 |
| 2023/0186161 A1 * | 6/2023 | Arthur ................. | G06F 40/58 704/2 |

* cited by examiner

*Primary Examiner* — Bhavesh M Mehta
*Assistant Examiner* — Darioush Agahi
(74) *Attorney, Agent, or Firm* — Fresh IP PLC; John R. Bednarz (57) ABSTRACT

A method includes extracting information from an unstructured data source, the method including: scraping, by at least one processor, a plurality of texts from the unstructured data source, extracting, by the at least one processor, from the plurality of texts a chunk of relevant text, summarizing, by the at least one processor, using a pre-trained summarizer, the chunk of relevant text to obtain semi-structured information comprising a set of sentences that summarize the chunk of relevant texts, and postprocessing, by the at least one processor, the semi-structured information to obtain structured information. The method can be executed highly efficiently, in particular on massively parallel hardware.

16 Claims, 3 Drawing Sheets

METHOD FOR EXTRACTING INFORMATION FROM AN UNSTRUCTURED DATA SOURCE

TECHNICAL FIELD

The present disclosure relates to a method for extracting information from an unstructured data source. The present disclosure also relates to a computer-readable storage medium storing program code, the program code comprising instructions for carrying out such a method.

BACKGROUND

The Internet offers an extreme wealth of information. However, the majority of information on the Internet is unstructured. In particular, information about companies is published in news articles, press releases and other websites in unstructured and non-standardized text formats. Extracting financial details (especially about funding rounds and/or revenue of the companies) and storing this extracted information in a database as structured data is crucial for performing various kinds of data analytics.

Traditionally, funding round or revenue details are gathered from news articles or press releases by crowdsourcing and usually this process involves a lot of manual effort. Automation of financial data extraction can speed up the data acquisition process, ability to scan for news articles from a lot more newsletter sources and online news feeds than possible using crowdsourcing and produce stable and reliable results.

In view of the above, there is a need for a solution for automatically extracting information from an unstructured data source.

SUMMARY

The objective of the present disclosure is to provide a device for extracting information from an unstructured data source and a non-transitory computer readable storage medium, which overcome one or more of the above-mentioned problems associated with conventional solutions.

A first aspect of the present disclosure provides a method for extracting information from an unstructured data source, the method comprising:
  scraping, by at least one processor, a plurality of texts from the unstructured data source;
  extracting, by at least one processor, from the plurality of texts a chunk of relevant text;
  summarizing, by at least one processor, using a pre-trained summarizer, the chunk of relevant text to obtain semi-structured information comprising a set of sentences that summarize the chunk of relevant texts; and
  postprocessing, by at least one processor, the semi-structured information to obtain structured information.

The method of claim 1 has the advantage that the summarizing step, which has shown to be computationally the most expensive, can be completely parallelized and thus performed most efficiently on massively parallel hardware.

The information may be financial information and may include funding and/or revenue information, in particular funding and/or revenue information of one or more companies.

The unstructured data source may be for example websites or PDFs on the Internet. The plurality of texts may comprise formatting attached to the texts. Preferably, extracting the chunk of relevant texts from the plurality of texts comprises stripping away formatting. However, information from the formatting, e.g., the information that a certain text passage is highlighted, underlined or part of a table, may be encoded in the chunk of relevant text, so that it is available for the summarizer as input information.

Pre-training the summarizer can involve training a neural network of the summarizer. However, in other embodiments it can be sufficient that merely one or more parameters of the summarizer are obtained based on training data.

The semi-structured financial information may comprise a set of sentences that summarize the chunk of relevant texts. However, in other embodiments the semi-structured financial information may also comprise additional information, e.g., the sentences may be assigned to certain categories, such as funding, revenue, earnings, forecast, . . . .

Postprocessing the semi-structured financial information may include any form of processing that allows to obtain the final structured financial information. The structured financial information may be representable as a table, where values from the unstructured data source are assigned to specific keys, e.g., "revenue 2022", "forecast 2023", "EBITDA 2022", . . . .

Summarization herein is the task of condensing a piece of text to a shorter version, reducing the size of the initial text while at the same time preserving key informational elements and the meaning of content. There are various models based on machine learning available for this task. Some approaches model this problem as a classification problem which outputs whether to include a sentence in the summary or not. Other approaches have used topic information, Latent Semantic Analysis (LSA), Sequence to Sequence models, Reinforcement Learning, and Adversarial processes.

In general, summarization can be based on extraction and abstraction. Extractive summarization picks up sentences directly from the document based on a scoring function to form a coherent summary. This method works by identifying important sections of the text by cropping out and stitching together portions of the content to produce a condensed version.

Abstractive summarization on the other hand aims at producing a summary by interpreting the text using advanced natural language techniques in order to generate a new shorter text—parts of which may not appear as part of the original document, that conveys the most critical information from the original text, requiring rephrasing sentences and incorporating information from full text to generate summaries such as a human-written abstract usually does. In fact, an acceptable abstractive summary covers core information in the input and is linguistically fluent. Thus, they are not restricted to simply selecting and rearranging passages from the original text.

The presented method is preferably used with abstractive summarization techniques. These may use deep learning for training the summarization method based on example summaries, e.g., manually obtained example summaries.

In a first implementation of the method of the first aspect, the method further comprises pre-processing the texts, wherein the pre-processing comprises detecting a language of a text of the plurality of texts and if the text is not in a target language, using computer translation to translate the text into the target language.

This has the advantage that the subsequent processing steps are performed only in the target language, thus reducing the complexity and memory requirements of the subsequent processing steps.

In a further implementation of the method of the first aspect, extracting from the plurality of texts the chunk of relevant text comprises classifying text passages, in particular sentences, of the plurality of text according to whether each text passage is funding-related.

This has the advantage that subsequent processing steps are carried out only on relevant text passages, thus reducing the computational effort of the subsequent processing steps.

In a preferred embodiment, the extracting from the plurality of texts a chunk of relevant text comprises using a crawler to parse a plurality of web text sources, wherein the plurality of web text sources comprise at least one of news articles, newsletters, and company websites.

This has the advantage that commonly and publicly available data sources can be used as input, thus a sufficient amount of input data as training data is available. Additional pre-processing steps may be provided, e.g., for extracting text and stripping away HTML coding or other formatting.

In a further implementation of the method of the first aspect, the pre-trained summarizer has been pre-trained using extracted funding information.

The summarizer may comprise one or more parameters that can be obtained e.g., using manually extracted funding information. In other embodiments, for a certain set of companies, ground truth funding information may be available. This ground truth information may be used to determine optimum values of one or more parameters of the summarizer.

In a further implementation of the method of the first aspect, at least one of
  the pre-trained summarizer has been trained to extract informative passages, from the chunk of relevant text, and
  the pre-trained summarizer transforms the chunk of relevant text into an intermediate representation that comprises vector representations of information in the chunk of relevant text.

Deciding on which passages are informative passages can be based on predetermined rules. However, it is often preferable that the summarizer is trained to extract informative passages based on a training dataset where informative passages have been manually identified. Thus, the summarizer can be trained based on an experienced human annotator.

Extracting the most informative sentences can mean that the summarizer does not change the sentences, but merely extracts those sentences that are most informative for obtaining the structured financial information. This reduces the computational burden.

Transforming the chunk of text into an intermediate presentation may be initially computationally more demanding, but has the advantage that the intermediate representation may be more condensed than the original text passages, which may improve accuracy and computational efficiency of subsequent processing steps.

In preferred embodiments, the intermediate representation comprises vector representations, but still comprises the numeric financial data (e.g., amounts in currencies) in their original textual form.

In further embodiments, a hybrid model may be used that extracts the most informative passages and transforms these into an intermediate representation.

In a further implementation of the method of the first aspect, the extraction from the plurality of texts the chunk of relevant text comprises classifying text passages in the plurality of texts into relevant sentences and non-relevant sentences and concatenating the relevant text passages to build the chunk of relevant text.

This has the advantage that the summarizer is provided with a contiguous chunk of relevant text. Preferably, the chunk of text has been previously stripped of formatting in a pre-processing step.

In a further implementation of the method of the first aspect, the classification the text passages comprises using sentiment analysis to determine a sentiment of the text passage, wherein the text passage is classified as non-relevant if the sentiment is non-neutral, and if a sentiment value deviates from a neutral sentiment value more than a predetermined threshold.

Experiments have shown that the core financial information, in particular from serious and trustworthy information providers is typically provided in neutral sentences. Thus, it may be preferable to exclude information that comprises a strong sentiment value as determined by sentiment analysis algorithms.

In a further implementation of the method of the first aspect, the classification the text passages comprises determining at least one of a ratio, an absolute number of occurrences of predetermined special characters, and character sequences and classifying the text passage as relevant if the determined number is higher than one of a predetermined threshold number and the ratio is higher than a predetermined threshold ratio.

The special characters may comprise a predetermined set of special characters that relate to currencies, e.g., the € sign or the $ sign, and/or the predetermined character sequences may comprise common abbreviations of currencies, e.g., EUR, USD, or CNY. This provides a computationally extremely efficient way of quickly determining whether a text passage may be related to financial information. In other embodiments, the predetermined character sequences may directly relate to the to-be-extracted structured financial information, e.g., "revenue", "earnings", "EBITDA", . . . .

In a further implementation of the method of the first aspect, the postprocessing of the semi-structured information to obtain the structured information comprises:
  providing the semi-structured information as input to a database for a question-answering algorithm, and
  obtaining the structured information by providing predetermined questions to the question-answering algorithm.

This has the advantage that the highly accurate question-answering algorithms that have been developed in recent years can be employed for financial data extraction. For example, a QA algorithm may be provided with a chunk of text about a company X as context and may then be given the question "What was the revenue of company X in the year 2021?". This may allow extracting specific financial information even if it is merely expressed in language that does not match a specific predetermined format.

In a further implementation of the method of the first aspect, the scraping of the plurality of texts from the unstructured data source comprises:
  obtaining an unstructured formatted text from the unstructured data source,
  obtaining a title of the unstructured formatted text, based on a formatting of the title in the unstructured formatted text,
  using a title classification model to classify the title as one of relevant and non-relevant, and
  if the title is classified as relevant, parsing the unstructured formatted text and including the title in the plurality of texts.

This has the advantage that the large amount of articles and textual information that may be available from the unstructured data source can be efficiently filtered to include only those texts that are actually likely to be of relevance for determining the target structured financial information.

In a further implementation of the method of the first aspect, the method further comprises validating the structured information based on a consistency check between one or more values of entries in the structured information and rejecting the structured information if the validating fails.

For example, if the revenue has a negative value or if the sum of the quarterly revenues of a year is significantly different from a yearly revenue for that year, it may be assumed that this structured information is not valid. In other cases, e.g., if a yearly earning is significantly higher than a yearly revenue, this structured financial information may be flagged as uncertain. This information could be provided to the user as a warning and/or it could be required that the same information is obtained from a plurality of unrelated data sources before it is considered as reliable.

In other embodiments, a confidence score may be determined for one or more entries of the structured financial information. The confidence score may be influenced by how likely the combination of the structured financial information is, but also based on how many sources, preferably how many unrelated sources, provided input for the structured financial information for a specific company.

A second aspect of the present disclosure relates to a device for extracting information from an unstructured data source, the device comprising at least one processor to:
- extract a plurality of texts from the unstructured data source;
- extract the plurality of texts into a relevant chunk of text;
- summarize the chunk of text to obtain semi-structured information comprising a set of sentences that summarize the chunk of text; and
- postprocess the semi-structured information to obtain structured information.

The device of the second aspect may be configured to carry out the method of the first aspect or one of its implementations.

In a first implementation of the device of the second aspect, each of the at least one processor is further configured to summarize the chunk of text in parallel. This has the advantage that the summarizer can be particularly efficiently executed in parallel on hardware.

In other embodiments, only one processor is configured to summarize the chunk of text in parallel.

In a first implementation of the device of the second aspect, each of at least one processor is further used to summarize the chunk of text in parallel.

This has the advantage that the summarizer can be particularly efficiently executed on parallel hardware.

In a further implementation of the device of the second aspect, the at least one processor is further to:
- receive the chunk of text by an encoding neural network as an input sequence and generate an encoded representation of the chunk of text; and
- receive the encoded representation by a decoding neural network and generate the semi-structured information as output.

This has the advantage that the transformer model may be trained to specifically encode the information that is relevant for determining the structured financial information.

Preferably, the encoding neural network comprises a plurality of encoder subnetworks, wherein each of the encoder subnetworks receives an input for each of a plurality of input positions and generates an output for each of the plurality of input positions, wherein each encoder subnetwork comprises an encoder self-attention sub-layer and applies a self-attention mechanism over the encoder subnetwork inputs.

Applying the self-attention mechanism has the advantage that the transformer model can be trained to learn the correspondence between certain parts of the input. For example, the transformer can learn the correspondence between "annual profit" and the corresponding value, even if these appear not directly next to each other in the chunk of text.

Preferably, the at least one processor is further to receive a plurality of parameters that have been optimized using end-to-end training on a training dataset.

This embodiment has the advantage that, if a sufficient amount of training data is available, all parameters of the device may be optimized based on the training data. In other words, it is not a sub-task that is trained separately, but the entire task, from the input data to the specific desired structured financial information is trained in one end-to-end training.

A further aspect of the present disclosure provides a computer readable storage medium having instructions stored thereon that, when executed by at least one processor cause the at least one processor to perform operations, the operations comprising:
- scraping, by at least one processor, a plurality of texts from the unstructured data source;
- extracting, by at least one processor, from the plurality of texts a chunk of relevant text;
- summarizing, by at least one processor, using a pre-trained summarizer, the chunk of relevant text to obtain semi-structured information comprising a set of sentences that summarize the chunk of relevant texts; and
- postprocessing, by at least one processor, the semi-structured information to obtain structured information.

BRIEF DESCRIPTION OF THE DRAWINGS

To illustrate the technical features of embodiments of the present disclosure more clearly, the accompanying drawings provided for describing the embodiments are introduced briefly in the following. The accompanying drawings in the following description are merely some embodiments of the present disclosure; modifications on these embodiments are possible without departing from the scope of the present disclosure as defined in the claims.

DETAILED DESCRIPTION

The foregoing descriptions are only implementation manners of the present invention, the scope of the present invention is not limited to this. Any variations or replacements can be easily made through a person skilled in the art. Therefore, the protection scope of the present invention should be subject to the protection scope of the attached claims.

An embodiment of the present disclosure provides a system that monitors and scrapes the online news feed and press releases from company websites, identifies if the scraped unstructured text from the news articles is related to funding and/or revenue using deep learning based Text Classification. Furthermore, the news articles classified as funding and/or revenue are further processed using a deep learning based summarization technique to automatically transform unstructured text into structured funding information like organisation funded, investors, funding type and funded amount or revenue information like organisation, revenue and its fiscal year.

Deep learning herein preferably refers to a learning that makes use of an artificial neural network (ANN) with multiple layers between the input and output layers.

This structured financial information extracted can further be validated based on custom standards and can be mapped to the companies in the database using a hybrid approach that comprises URL matching and Named Entity Linking (NEL). This automatically extracted financial information can be used for charting. This allows a user to understand trends in company funding rounds or revenue over a period of time and also over specific geographical locations. Preferably, they are also displayed on a web interface, e.g., in the company financial section.

Figure 1:
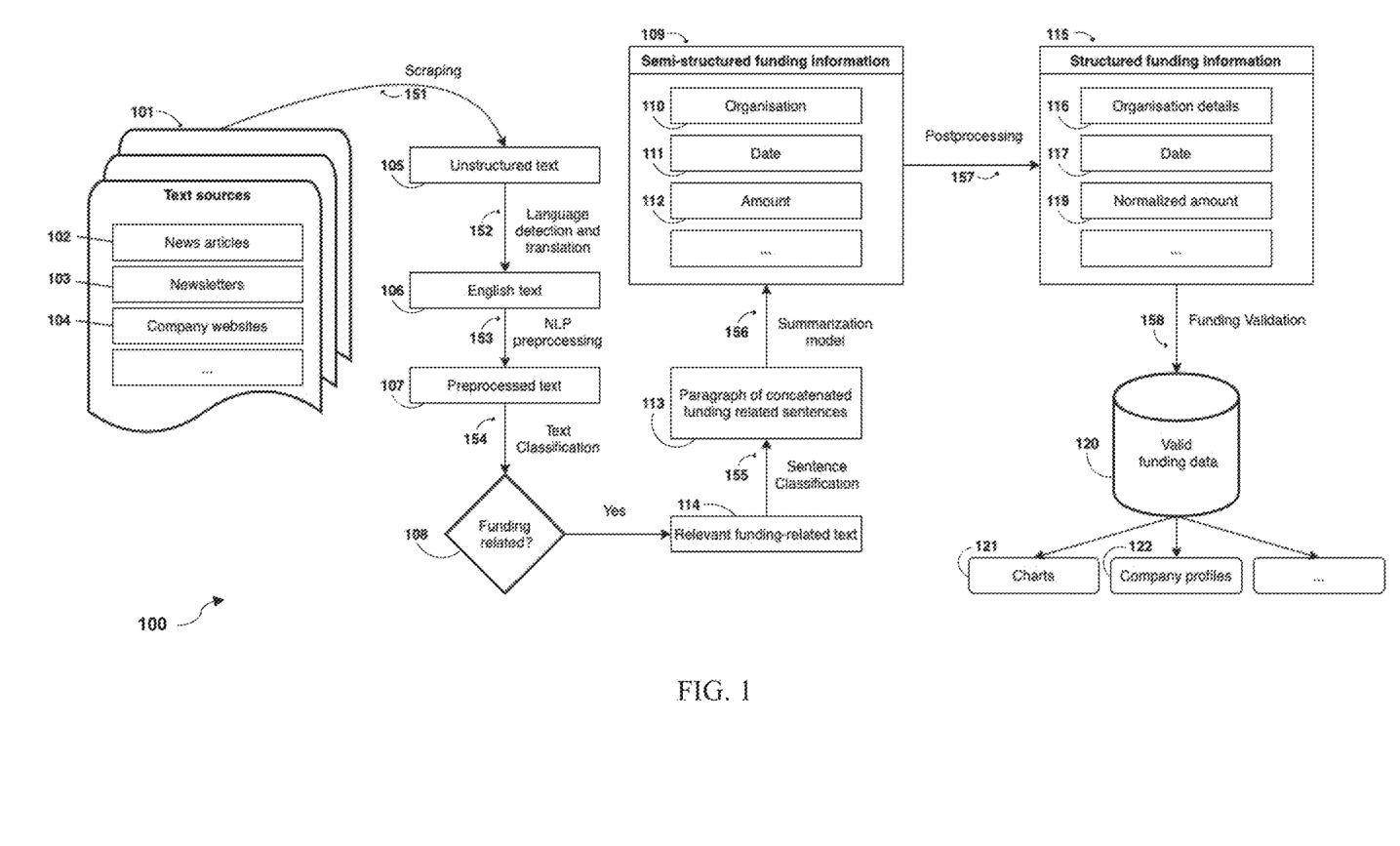
FIG. 1 is a block diagram illustrating a method for extracting financial information according to an example of the instant disclosure.

FIG. 1 shows an example workflow of a method of a funding and revenue information extraction system in accordance with an embodiment of the present disclosure.

The method 100 is provided with input data 101 and processes the input data into charts 121 and company profiles 121.

The input data 101 can comprise various text sources, such as news articles 102, newsletter 103, and company websites 104. The input data 101 can be obtained e.g., by a crawler (not shown in FIG. 1) that crawls the Internet for potential sources of information.

Information is extracted from the data 101 by a scraper 151. This results in unstructured text 105. This unstructured text 105 is prepared for classification by a text classification system 154 by first detecting the language and translating 152 to obtain English text 106. The next step includes various natural language processing (NLP) pre-processing techniques 153 which result in pre-processed text 107. For example, the NLP pre-processing can include that errors are removed or the texts are brought into a uniform format.

Scraping herein can refer to an extraction of texts from a source that comprises more than just text. For example, websites comprise text, images, meta information, and so on.

A text classification system 154 classifies the pre-processed text 107 into funding or revenue related and not funding or revenue related 108. Classification of a news article can e.g., be performed by a spaCy ensemble text categorizer model based on the title of the given article.

A sentence level classification 155 is then only performed on the relevant funding or revenue-related text 114. All of the funding related sentences are concatenated into a single paragraph 113 and all of the revenue related sentences are concatenated into a single paragraph in a subsequent step. The consolidated funding paragraph 113 is fed into a deep learning based summarization model 156 which outputs semi-structured funding information 109 comprising parameters like the organization in focus 110, the date 111, and the amount 112 including the currency.

The consolidated revenue paragraph (not shown in FIG. 1) is also fed into a deep learning based summarization model 156 which outputs semi-structured revenue information comprising parameters such as the organization in focus, revenue, and fiscal year.

The semi-structured funding information 109 is further post-processed 157 to obtain structured funding information 115. During the post-processing 157 organization details 116, e.g., the organization URL, are extracted. The date 117 is approximated and the amount normalized 119 by performing currency conversion and applying pre-defined standards.

The semi-structured revenue information can further be post-processed by extracting the organization URL, standardizing the fiscal year to a numerical year format, and the unstructured revenue amount can be converted to a numeric amount format including a currency normalized to pre-defined standards. Each of these steps can comprise an additional validation step where data that do not appear to be valid are discarded. This is possible because the data source comprises redundant information. For example, there will typically be many news articles on the same event. Thus, the system can discard many pieces of information on this event and still obtain all relevant information on this event.

A funding and revenue validation service 158 inserts the valid funding and revenue data records 120 into the database. This validated data 120 can then be utilized to create charts 121 or to add the validated data to a company profile 122.

Apart from initial screening of news articles and filtering of news article text to focused information using text classification, a single summarization model is used to convert unstructured text to structured information. This enables it to easily parallelize massively to process a lot of news articles at a time through multiple instances of this single summarization model. In the presented example implementation, the single summarization model has a size of 1.4 GB and can easily fit into a 4 GB GPU memory for processing. Competitive approaches (as presented in more detail below) would require multiple steps and in turn multiple models to be fit into the memory. Equivalently good and generalized models could add up to far above 2 GB of memory requirements.

Further advantages of the presented method include the following:

Apart from initial screening of news articles and filtering of news article text to focused information using text classification, a single summarization model is used to convert unstructured text to structured information.

This single summarization model is capable of achieving high accuracy while taking less inference time with convenience to easily parallelize over competitive approaches that involve multiple step processes and models.

Training, fine-tuning, or retraining of a single summarization model is a lot easier than multiple models. Training data acquisition or annotation efforts for a single model is very efficient over multiple datasets for multiple models in competitive approaches.

The presented method is easy to scale and fine-tune for other information extraction use-cases. Initially, this approach was used only for "Funding" information extraction and in order to scale it to extract "Revenue" information, developers had to focus on only acquiring the data for revenue information extraction and just fine-tune the model with this new dataset. Competitive approaches would involve modifying the model parameters and include new labels, etc. for multiple steps apart from training data acquisition.

Figure 2:
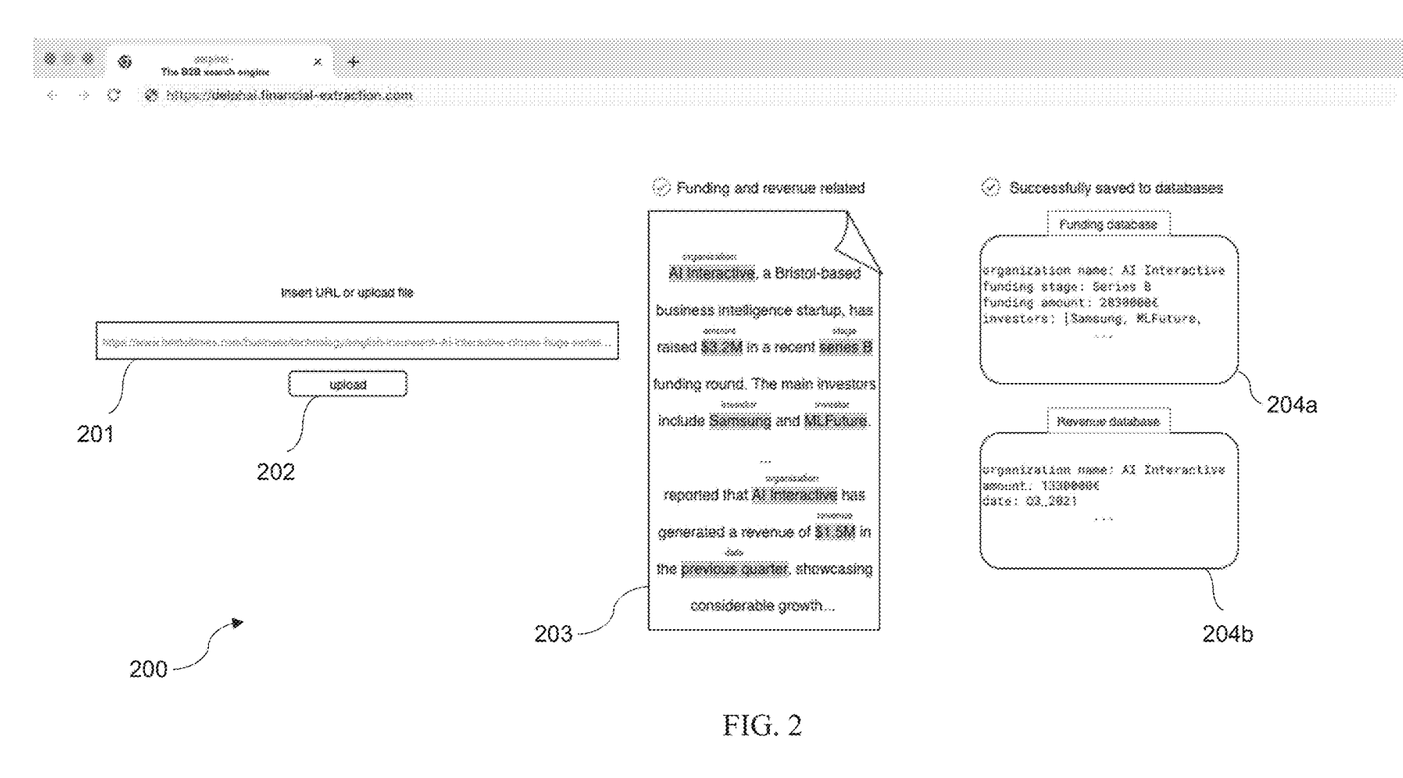
FIG. 2 is a block diagram illustrating a user interface according to an example of the instant disclosure.

FIG. 2 shows an example implementation of a user interface 200 for the presented system. With this user interface, the user submits the data from which the financial information is to be extracted and it is subsequently inserted into the database. The user is initially urged to insert into a box 201 the text that is to be processed. The choice of medium by which the text is inserted could be, but is not limited to, a URL that links to a web page containing the text, or a PDF file containing said text. The URL can be entered by the user into a multi-purpose box 201. The box 201 is multi-purpose in that it can be used both for entering a URL, a text to be parsed, or a location of a PDF file to be uploaded. The user interface 200 further provides an upload button 202, which starts the process of retrieving and processing the text as indicated in the multi-purpose box 201.

If the processed text passes the classification 154 of the method as shown in FIG. 1, then the relevant sentences 113 of FIG. 1 are displayed to the user in a separate box 202, with all the relevant data highlighted and labelled in the text 102. If the classification 154 of FIG. 1 is not passed, then the message in 102 would indicate that the document is not funding or revenue related and no other information is shown. In the last step 103, the data is shown in a structured manner. Each data field has been processed 157 and the user is informed that it has been saved to the respective database.

The presented summarization approach has been compared extensively with competitive approaches that do not make use of the summarization.

The presented approach combines title text classification, sentence-level text classification, custom summarization and simple rule-based slot filling in sequence. Slot filling refers to identifying and tagging contiguous spans of words that represents the structured information attributes that we expect to extract from summarized text. As input it uses unstructured text (example: news article texts). Then, multi-label text classification of the news article title is performed in classes that comprise: Funding, Revenue, and Others. Sentence-level multi-label text classification of news article content is performed into classes that comprise: Funding, Revenue, and Others. Consolidated text of filtered sentences is obtained in a further step. Semi-structured/template based text (contains normalized and intended output) is obtained using custom summarization. Furthermore, simple rule-based slot filling is performed.

The competitive approach that is used for comparison does not use summarization. In particular, it is structured as follows:

Title text classification, sentence-level text classification, Named Entity Recognition (NER), relationship classification, and slot filling are combined in sequence. Input is unstructured text (Example: News article text). Multi-label text classification of the news article title is performed into classes that comprise: Funding, Revenue, and Others. Sentence-level multi-label text classification of news article content into classes that comprise: Funding, Revenue, and Others. Consolidated text of filtered sentences is obtained in a further step. NER is performed to extract entities organization, amount, date, funding stage, etc. Relationship classification is performed to classify and extract relations between all combinations of entities. Complex slot filling is performed to resolve multiple candidates and normalize output.

Furthermore, the presented method has been compared with an additional competitive approach that uses coref-resolution. This approach is structured as follows:

Title Text Classification, Sentence-level Text Classification, NER, Relationship Classification and Slot Filling are combined in sequence. Input: Unstructured text (Example: News article text). Multi-label Text classification of the news article title into classes comprising: Funding, Revenue and Others. Sentence-level multi-label text classification of news article content into classes comprising: Funding, Revenue and Others. The consolidated text of filtered sentences is obtained. NER is used to extract entities organization, amount, date, funding stage, etc. Coref-resolution resolves all expressions that refer to the same entity in a text. Relationship classification is used to classify and extract relations between all combinations of entities. Complex slot filling is used to resolve multiple candidates and normalize output.

The following table shows a comparison of the presented method with text summarization with competitive approaches, wherein the competitive approaches do not use summarization. Both the competitive methods and the presented method were computed on an Intel® Core™ i9-9980HK CPU @2.40 GHz×16, using Ubuntu 20.04.3 LTS.

TABLE 1

| | Inference Time (in seconds) | F1 Score |
|---|---|---|
| Presented Summarization Approach | 6.13 | 96.72% |
| Competitive Approach | 8.27 | 83.14% |
| Competitive Approach with coref resolution | 15.12 | 88.13% |

As can be seen from the comparison, the presented method is both vastly faster to execute and yields higher accuracy compared to the competitive approaches.

The following tables give a more detailed comparison:

TABLE 2

| | Inference Time (in seconds) | F1 Score | ROUGE-N Score |
|---|---|---|---|
| Title Text Classification | 0.01 | 98.93% | |
| Sentence-level Text Classification | 0.01 | 97.49% | |
| Presented Summarization Approach | 6.1 | | 98.75% |
| Simple rule-based slot filling (presented approach) | 0.001 | 100.0 | |

TABLE 3

| | Inference Time (in seconds) | F1 Score |
|---|---|---|
| Title Text Classification | 0.01 | 98.93% |
| Sentence-level Text Classification | 0.01 | 97.49% |
| NER (competitive Approach) | 1.46 | 94.36% |
| Relationship Classification (competitive Approach) | 5.83 | 82.7% |
| Complex Slot Filling (competitive Approach) | 0.9 | 87.11% |

TABLE 4

| | Inference Time (in seconds) | F1 Score |
|---|---|---|
| Title Text Classification | 0.01 | 98.93% |
| Sentence-level Text Classification | 0.01 | 97.49% |
| NER (Competitive Approach) | 1.46 | 94.36% |
| Coref-resolution (competitive approach) | 6.85 | 81.0% |
| Relationship Classification (competitive Approach) | 5.83 | 89.5% |
| Complex Slot Filling (competitive approach) | 0.9 | 94.2% |

As can be seen from the above test results, the presented approach is superior to competitive approaches without summarization on all relevant measures.

The presented method can be used for extracting funding and revenue-related information. However, alternative embodiments can also be used for extracting other information, e.g., company descriptions. The company description herein is preferably a short summary of the company. A short summary of the company is an essential feature for the customers to get quick insights about a certain company. Traditionally, company descriptions are created by crowd-sourcing and require a lot of manual effort.

Moreover using descriptions available on the internet oftentimes creates copyright issues. As part of the company data enrichment process, the automation of a unique description generation pipeline allows us to process all the available company information including unstructured data and provide a concise overview of the company. Since it is auto-generated, the resulting texts are novel and thus fully copyright-compliant.

In a preferred embodiment, a method takes in a wide range of unstructured company information in the form of website text, news, etc. and generates unique company descriptions. Text classification is done at web page or article level, paragraph level, and sentence level to produce a curated raw company text that can potentially be part of company description and further processed using Deep learning based Summarization and Paraphrasing techniques to produce concise and paraphrased text that well describes the company in a distinctive manner.

Figure 3:
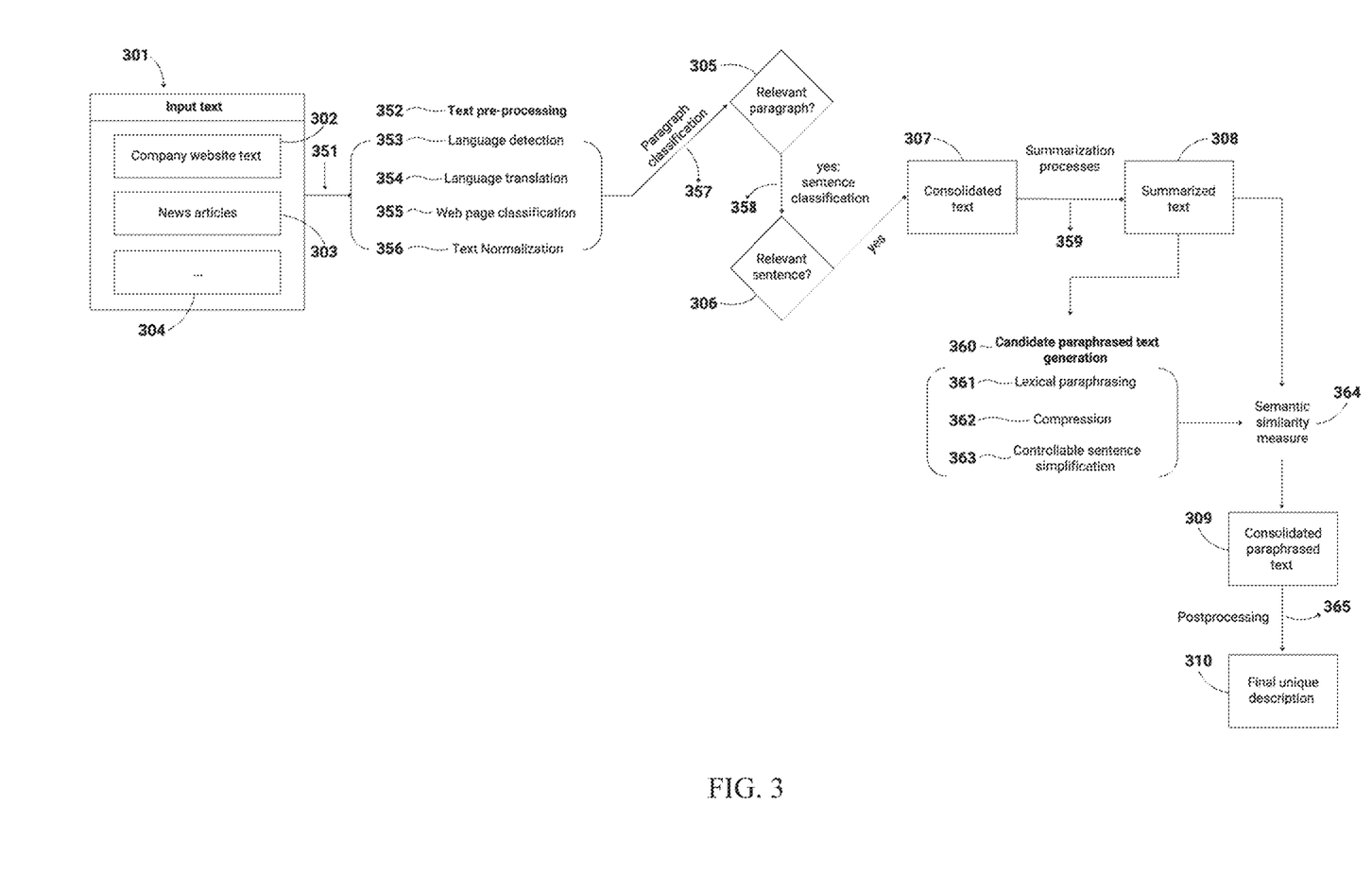
FIG. 3 is a flow chart of a method for extracting and generating a company description, according to an example of the instant disclosure.

FIG. 3 shows an example workflow of the description generation model. The input data 301 can comprise, and is not limited to, company website text 302 and news articles 303. This data 301 is fed in step 351 into an array of text pre-processing modules 352 that perform, in that order, language detection 353, language translation 354 (if deemed necessary after the language detection 153), web page classification 355 (when dealing with company website text 102), and text normalization 356. The resulting pre-processed data is subsequently broken-down into paragraphs and undergoes a paragraph-level binary classification 357, which determines if a paragraph is relevant towards the goal of description generation. The paragraphs 305 with a positive outcome of the classification 357 are broken-down into sentences and undergo a sentence-level binary classification 358, which, similarly to the previous classification 357, determines the relevance of each sentence. The relevant sentences 306 are combined into a consolidated text 307. The consolidated text 307 is then summarized 359. The summarization process 359 can use, for instance, textrank in combination with TF-IDF and cosine similarity-based sentence filtering and ranking followed by a BART summarization-based abstractive summarization, or a BERT extractive summarization. At sentence level of the resulting summarized text 308 candidate paraphrased text 360 is generated. The paraphrasing steps 360 involve text transformations like lexical paraphrasing 361, compression 362, and controllable sentence simplification 363. Afterwards, a semantic similarity measure 364 between the summarized text 308 and the candidate paraphrased texts 360 is applied which results in a consolidated paraphrased text 309. This text 309 is further post-processed 365 to obtain a final unique description 310. The final unique description can then be used as input for post-processing to obtain the structured information.

The methods and operations discussed herein can be performed by a computing system, which can be for example any computing device or any component thereof in which the components of the system are in communication with each other using a connection. The connection can be a physical connection via a bus, or a direct connection into a processor, such as in a chipset architecture. The connection can also be a virtual connection, networked connection, or logical connection.

In some embodiments, the computing system is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example system includes at least one processing unit (CPU or processor) and the connection that couples various system components including system memory, such as read-only memory (ROM) and random access memory (RAM) to the processor. The computing system can include a cache of high-speed memory connected directly with, in close proximity to, or integrated as part of the processor.

The processor can include any general purpose processor and a hardware service or software service, such as services stored in a storage device, configured to control the processor as well as a special-purpose processor where software instructions are incorporated into the actual processor design. The processor may essentially be a completely self-contained computing system, containing multiple cores or processors, a bus, memory controller, cache, etc. A multi-core processor may be symmetric or asymmetric.

To enable user interaction, the computing system includes an input device, which can represent any number of input mechanisms, such as a microphone for speech, a touch-sensitive screen for gesture or graphical input, keyboard, mouse, motion input, speech, etc. The computing system can also include an output device, which can be one or more of a number of output mechanisms known to those of skill in the art. In some instances, multimodal systems can enable a user to provide multiple types of input/output to communicate with the computing system. The computing system can include a communications interface, which can generally govern and manage the user input and system output. There is no restriction on operating on any particular hardware arrangement, and therefore the basic features here may easily be substituted for improved hardware or firmware arrangements as they are developed. A storage device can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device can include software services, servers, services, etc., that when the code that defines such software is executed by the processor, it causes the system to perform a function. In some embodiments, a hardware service that performs a particular function can include the software component stored in a computer-readable medium in connection with the necessary hardware components, such as the processor, the connection, the output device, etc., to carry out the function.

For clarity of explanation, in some instances, the present technology may be presented as including individual functional blocks including functional blocks comprising devices, device components, steps, or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media.

Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

The invention claimed is:

1. A method for extracting information from an unstructured data source, the method comprising:
    scraping, by at least one processor, a plurality of texts from the unstructured data source, the scraping comprising obtaining an unstructured formatted text from the unstructured data source, obtaining a title of the unstructured formatted text, based on a formatting of the title in the unstructured formatted text, using a title classification model to classify the title as one of relevant and non-relevant, and if the title is classified as relevant, parsing the unstructured formatted text and including the title in the plurality of texts;
    extracting, by the at least one processor, from the plurality of texts a chunk of relevant text;
    summarizing, by the at least one processor, using a pre-trained summarizer, the chunk of relevant text, each of the at least one processor to summarize the chunk of relevant text in parallel to obtain semi-structured information comprising a set of sentences that summarize the chunk of relevant text; and
    postprocessing, by the at least one processor, the semi-structured information to obtain structured information.

2. The method of claim 1, further comprising pre-processing the plurality of texts, wherein the pre-processing comprises detecting a language of a text of the plurality of texts and if the plurality of texts are not in a target language, using computer translation to translate the plurality of texts into the target language.

3. The method of claim 1, wherein the extracting from the plurality of texts the chunk of relevant text comprises classifying text passages, in particular sentences, of the plurality of texts according to whether each text passage is funding-related.

4. The method of claim 1, wherein the extracting from the plurality of texts the chunk of relevant text comprises using a crawler to parse a plurality of web text sources, wherein the plurality of web text sources comprise at least one of news articles, newsletters, and company websites.

5. The method of claim 1, wherein the pre-trained summarizer has been pre-trained using extracted funding information.

6. The method of claim 1, wherein at least one of
    the pre-trained summarizer has been trained to extract informative passages, from the chunk of relevant text, and
    the pre-trained summarizer transforms the chunk of relevant text into an intermediate representation that comprises vector representations of information in the chunk of relevant text.

7. The method of claim 1, wherein the extracting from the plurality of texts the chunk of relevant text comprises classifying text passages in the plurality of texts into relevant sentences and non-relevant sentences and concatenating relevant text passages to build the chunk of relevant text.

8. The method of claim 7, wherein the classifying the text passages comprises using a sentiment analysis to determine a sentiment of the text passages, wherein a text passage is classified as non-relevant if the sentiment is non-neutral, and if a sentiment value deviates from a neutral sentiment value more than a predetermined threshold.

9. The method of claim 7, wherein the classifying the text passages comprises determining at least one of a ratio, an absolute number of occurrences of predetermined special characters, and character sequences, and classifying the text passages as relevant if the determined number of occurrences of predetermined special characters is higher than one of a predetermined threshold number and the ratio is higher than a predetermined threshold ratio.

10. The method of claim 1, wherein the postprocessing the semi-structured information to obtain the structured information comprises:
    providing the semi-structured information as input to a database for a question-answering algorithm, and
    obtaining the structured information by providing predetermined questions to the question-answering algorithm.

11. The method of claim 1, further comprising validating the structured information based on a consistency check between one or more values of entries in the structured information and rejecting the structured information if the validating fails.

12. A device for extracting information from an unstructured data source, the device comprising at least one processor to:
  extract a plurality of texts from the unstructured data source, by obtaining an unstructured formatted text from the unstructured data source, obtaining a title of the unstructured formatted text, based on a formatting of the title in the unstructured formatted text, using a title classification model to classify the title as one of relevant and non-relevant, and if the title is classified as relevant, parsing the unstructured formatted text and including the title in the plurality of texts;
  extract the plurality of texts into a chunk of relevant text;
  summarize the chunk of relevant text to obtain semi-structured information comprising a set of sentences that summarize the chunk of relevant text, the chunk of relevant text summarized by each of the at least one processor in parallel; and
  postprocess the semi-structured information to obtain structured information.

13. The device of claim 12, the at least one processor further to:
  receive the chunk of relevant text by an encoding neural network as an input sequence and generate an encoded representation of the chunk of relevant text; and
  receive the encoded representation by a decoding neural network and generate the semi-structured information as output.

14. The device of claim 13, wherein the encoding neural network comprises a plurality of encoder subnetworks, wherein each of the plurality of encoder subnetworks receives an input for each of a plurality of input positions and generates an output for each of the plurality of input positions,
  wherein each encoder subnetwork comprises an encoder self-attention sub-layer and applies a self-attention mechanism over the plurality of encoder subnetwork inputs.

15. The device of claim 12, the at least one processor further to receive a plurality of parameters that have been optimized using end-to-end training on a training dataset.

16. A non-transitory computer readable storage medium having instructions stored thereon that, when executed by at least one processor cause the at least one processor to perform operations, the operations comprising:
  scraping, by the at least one processor, a plurality of texts from an unstructured data source, the scraping comprising obtaining an unstructured formatted text from the unstructured data source, obtaining a title of the unstructured formatted text, based on a formatting of the title in the unstructured formatted text, using a title classification model to classify the title as one of relevant and non-relevant, and if the title is classified as relevant, parsing the unstructured formatted text and including the title in the plurality of texts;
  extracting, by the at least one processor, from the plurality of texts a chunk of relevant text;
  summarizing, by the at least one processor, using a pre-trained summarizer, the chunk of relevant text, each of the at least one processor to summarize the chunk of relevant text in parallel to obtain semi-structured information comprising a set of sentences that summarize the chunk of relevant text; and
  postprocessing, by the at least one processor, the semi-structured information to obtain structured information.

* * * * *